(12) United States Patent
Roh

(10) Patent No.: US 12,603,330 B2
(45) Date of Patent: Apr. 14, 2026

(54) BATTERY MODULE HAVING ELECTROLYTIC SOLUTION LEAKAGE DETECTION FUNCTION AND BATTERY PACK INCLUDING THE SAME

(71) Applicant: LG ENERGY SOLUTION, LTD., Seoul (KR)

(72) Inventor: Tae Hwan Roh, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 531 days.

(21) Appl. No.: 18/128,631

(22) Filed: Mar. 30, 2023

(65) Prior Publication Data

US 2024/0021888 A1 Jan. 18, 2024

Related U.S. Application Data

(63) Continuation of application No. PCT/KR2022/008838, filed on Jun. 22, 2022.

(30) Foreign Application Priority Data

Dec. 17, 2021 (KR) ........................ 10-2021-0181419

(51) Int. Cl.
| | |
|---|---|
| *H01M 10/42* | (2006.01) |
| *H01M 10/613* | (2014.01) |
| *H01M 10/647* | (2014.01) |
| *H01M 10/6554* | (2014.01) |
| *H01M 50/211* | (2021.01) |
| *H01M 50/242* | (2021.01) |
| *H01M 50/289* | (2021.01) |

(Continued)

(52) U.S. Cl.
CPC ..... *H01M 10/4228* (2013.01); *H01M 10/613* (2015.04); *H01M 10/647* (2015.04);
(Continued)

(58) Field of Classification Search
CPC ........... H01M 10/4228; H01M 10/613; H01M 10/647; H01M 10/6554; H01M 10/482; H01M 10/484; H01M 10/48; H01M 50/211; H01M 50/242; H01M 50/289; H01M 50/503; H01M 50/507; H01M 50/516; H01M 50/569; H01M 50/593; H01M 50/291; H01M 50/209; H01M 2200/00; H01M 2220/20
See application file for complete search history.

(56) References Cited

U.S. PATENT DOCUMENTS

| | | |
|---|---|---|
| 5,824,883 A | 10/1998 | Park et al. |
| 6,337,559 B1 | 1/2002 | Sato |

(Continued)

FOREIGN PATENT DOCUMENTS

| | | |
|---|---|---|
| JP | 5-326032 A | 12/1993 |
| JP | 10-115569 A | 5/1998 |

(Continued)

OTHER PUBLICATIONS

Extended European Search Report for European Application No. 22835541.8, dated Nov. 12, 2024.

*Primary Examiner* — Eugenia Wang
(74) *Attorney, Agent, or Firm* — Birch, Stewart, Kolasch & Birch, LLP

(57) ABSTRACT

A battery module has an electrolytic solution leakage detection function. The battery module has a busbar configured to detect an electrolytic solution leaked from a battery cell. The battery module can be used in a battery pack.

11 Claims, 6 Drawing Sheets

(51) Int. Cl.

| | |
|---|---|
| *H01M 50/503* | (2021.01) |
| *H01M 50/507* | (2021.01) |
| *H01M 50/516* | (2021.01) |
| *H01M 50/569* | (2021.01) |
| *H01M 50/593* | (2021.01) |

(52) U.S. Cl.

CPC ..... *H01M 10/6554* (2015.04); *H01M 50/211* (2021.01); *H01M 50/242* (2021.01); *H01M 50/289* (2021.01); *H01M 50/503* (2021.01); *H01M 50/507* (2021.01); *H01M 50/516* (2021.01); *H01M 50/569* (2021.01); *H01M 50/593* (2021.01)

(56) References Cited

U.S. PATENT DOCUMENTS

| | | | | |
|---|---|---|---|---|
| 2011/0117420 | A1* | 5/2011 | Kim | H01M 50/522 |
| | | | | 429/211 |
| 2018/0175464 | A1* | 6/2018 | Kim | H01M 10/6555 |
| 2020/0144580 | A1 | 5/2020 | Hong et al. | |
| 2021/0313664 | A1 | 10/2021 | Park et al. | |
| 2022/0037744 | A1 | 2/2022 | Lee et al. | |
| 2022/0328888 | A1 | 10/2022 | Moon et al. | |
| 2022/0367994 | A1 | 11/2022 | Jin et al. | |

FOREIGN PATENT DOCUMENTS

| | | | | |
|---|---|---|---|---|
| JP | 2001-84996 | A | 3/2001 | |
| JP | 2002-251985 | A | 9/2002 | |
| JP | 2017-98011 | A | 6/2017 | |
| JP | 2019-185861 | A | 10/2019 | |
| JP | 2020-71903 | A | 5/2020 | |
| KR | 10-1383599 | B1 | 4/2014 | |
| KR | 10-2020-0073042 | A | 6/2020 | |
| KR | 10-2021-0024892 | A | 3/2021 | |
| KR | 10-2021-0024917 | A | 3/2021 | |
| KR | 10-2021-0103297 | A | 8/2021 | |
| KR | 10-2021-0108269 | A | 9/2021 | |
| WO | WO-2020190067 | A1 * | 9/2020 | .......... H01M 50/262 |

* cited by examiner

--PRIOR ART--

BATTERY MODULE HAVING ELECTROLYTIC SOLUTION LEAKAGE DETECTION FUNCTION AND BATTERY PACK INCLUDING THE SAME

This application is a by-pass continuation of PCT/KR2022/008838, filed Jun. 22, 2022, which claims the benefit of priority to Korean Patent Application No. 2021-0181419 filed on Dec. 17, 2021, the disclosures of which are incorporated herein by reference in its entirety.

TECHNICAL FIELD

The present invention relates to a battery module having an electrolytic solution leakage detection function and a battery pack including the same, and more particularly to a battery module having an electrolytic solution leakage detection function configured such that the length of any one busbar is changed to sense an increase in level of an electrolytic solution when the electrolytic solution leaks in the battery module, thereby preventing fire outbreak due to short circuit outside a cell, and a battery pack including the same.

BACKGROUND ART

With technological development of mobile devices, such as smartphones, laptop computers, and digital cameras, and an increase in demand therefor, research on secondary batteries, which are capable of being charged and discharged, has been actively conducted. In addition, secondary batteries, which are energy sources substituting for fossil fuels causing air pollution, have been applied to an electric vehicle (EV), a hybrid electric vehicle (HEV), a plug-in hybrid electric vehicle (P-HEV), and an energy storage system (ESS).

There are a lithium ion battery, a lithium polymer battery, a nickel-cadmium battery, a nickel-hydride battery, and a nickel-zinc battery as secondary batteries that are widely used at present. For such a unit secondary battery cell, a plurality of battery cells is generally connected to each other in series or in parallel to constitute a battery module depending on required output voltage or charge and discharge capacities.

In particular, usage of a pouch-shaped lithium ion battery, configured to have a structure in which a stacked type or stacked and folded type electrode assembly is mounted in a pouch-shaped battery case made of an aluminum laminate sheet, has gradually increased due to advantages of low manufacturing cost and high energy density.

However, the pouch-shaped lithium ion battery has a problem in that, when thermally fused sealed portions are separated from each other, a flammable material, such as an electrolytic solution, leaks, whereby there is a danger of fire outbreak.

FIG. 1 is a conceptual view for sensing whether an electrolytic solution leaks in accordance with the conventional art. According to the conventional art of FIG. 1, an electrolytic solution absorption member 10 attached to the outside of a cell to absorb an electrolytic solution that leaks from the cell, the electrolytic solution absorption member having the characteristics of a conductor as the result of absorbing the electrolytic solution, a power supply unit 20 connected to opposite ends of the electrolytic solution absorption member to apply power to the electrolytic solution absorption member, a resistance unit 30 connected between the electrolytic solution absorption member and the power supply unit, a sensing unit 40 configured to sense whether current flows in the resistance unit, and a controller 50 configured to cut a fuse on a charging and discharging path of a battery pack by fusion in order to block charging and discharging current when the sensing unit sense that current flows in the resistance unit are included.

The conventional art has an advantage in that the leaked electrolytic solution is detected, whereby it is possible to protect a battery module or the battery pack; however, the overall structure is very complicated since the electrolytic solution is absorbed and whether current flows is sensed. Furthermore, a plurality of members must be additionally provided, whereby energy density is lowered.

PRIOR ART DOCUMENT (Patent Document 1) Korean Registered Patent Publication No. 1383599

DISCLOSURE

Technical Problem

The present invention has been made in view of the above problems, and it is an object of the present invention to provide a battery module having an electrolytic solution leakage detection function capable of rapidly detecting whether an electrolytic solution leaks through a simple structure and a battery pack including the same.

It is another object of the present invention to provide a battery module having an electrolytic solution leakage detection function capable of checking whether an electrolytic solution leaks without an increase in volume and a battery pack including the same.

Technical Solution

A battery module according to the present invention to accomplish the above objects has a busbar configured to detect an electrolytic solution leaked from a battery cell.

In addition, the battery module according to the present invention may include a module case including a bottom plate, a side plate, and a top plate; a plurality of battery cells received in the module case; and a plurality of busbars configured to connect the plurality of battery cells to each other in series or in parallel, and at least one of the plurality of busbars may include an extension portion protruding from a lower end of a busbar body by a predetermined length toward the bottom plate of the module case.

Also, in the battery module according to the present invention, a bottom edge of the extension portion of the busbar may be spaced apart from an upper surface of the bottom plate of the module case by a predetermined distance.

Also, in the battery module according to the present invention, the busbar body and the extension portion may be integrally formed.

Also, in the battery module according to the present invention, the busbar body and the extension portion may be separated from each other and may be electrically connected to each other by a connection member.

Also, in the battery module according to the present invention, the connection member may be welding or a thermally conductive adhesive.

In addition, the battery module according to the present invention may further include a shock absorption pad provided between an inner surface of the side plate of the module case and the plurality of battery cells.

In addition, the battery module according to the present invention may further include a heat dissipation pad provided between an upper surface of the bottom plate of the module case and the plurality of battery cells.

In addition, the battery module according to the present invention may further include a busbar frame interposed between the plurality of battery cells and the plurality of busbars.

Also, in the battery module according to the present invention, each of the plurality of battery cells may be a pouch-shaped battery cell.

In addition, a method of manufacturing a battery module according to the present invention includes a first step of preparing a module case, a plurality of battery cells, and a busbar and a second step of receiving the plurality of battery cells in the module case and electrically connecting the battery cells to each other through the busbar, wherein at least one of a plurality of busbars is provided with an extension portion protruding from a lower end of a busbar body by a predetermined length toward a bottom plate of the module case.

In addition, the present invention provides a battery pack including the battery module.

Advantageous Effects

A battery module having an electrolytic solution leakage detection function according to the present invention and a battery pack including the same have an advantage in that an extension portion facing the bottom of a module case is provided at a lower end of any one busbar, whereby it is possible to rapidly detect whether an electrolytic solution leaks.

In addition, the battery module having the electrolytic solution leakage detection function according to the present invention and the battery pack including the same have a merit in that a sensor configured to detect the electrolytic solution or a separate controller is not necessary, whereby it is possible to prevent a decrease in energy density.

Furthermore, the battery module having the electrolytic solution leakage detection function according to the present invention and the battery pack including the same have an advantage in that, when the level of the leaked electrolytic solution is increased, one busbar may sense the same in advance, whereby it is possible to detect and prevent short circuit outside a cell in advance, and therefore it is possible to inhibit occurrence of abrupt fire outbreak.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery module having an electrolytic solution leakage detection function according to the present invention will be described.

Figure 1:
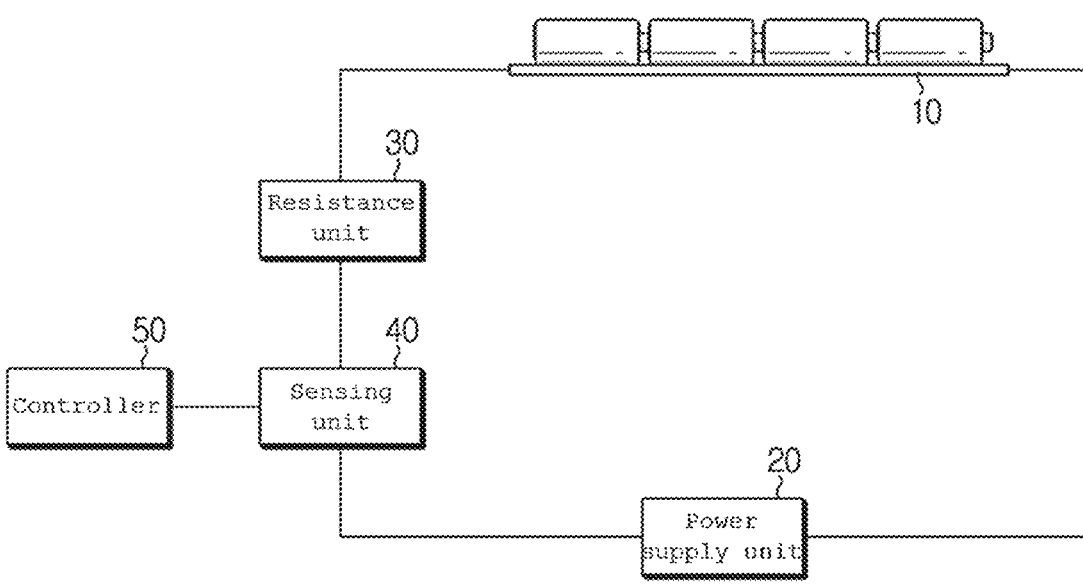
FIG. 1 is a conceptual view for sensing whether an electrolytic solution leaks in accordance with the conventional art.
Figure 2:
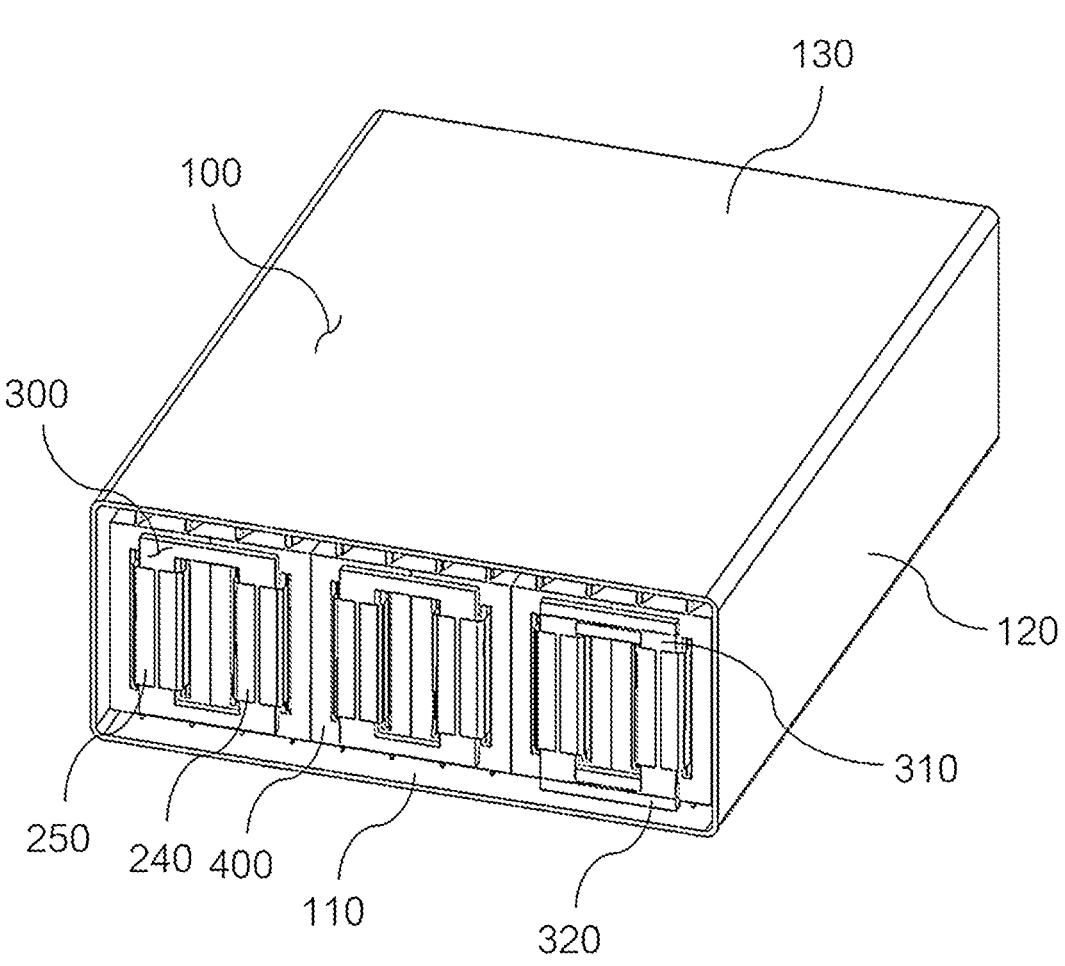
FIG. 2 is a perspective view of a battery module according to a preferred embodiment of the present invention.
Figure 3:
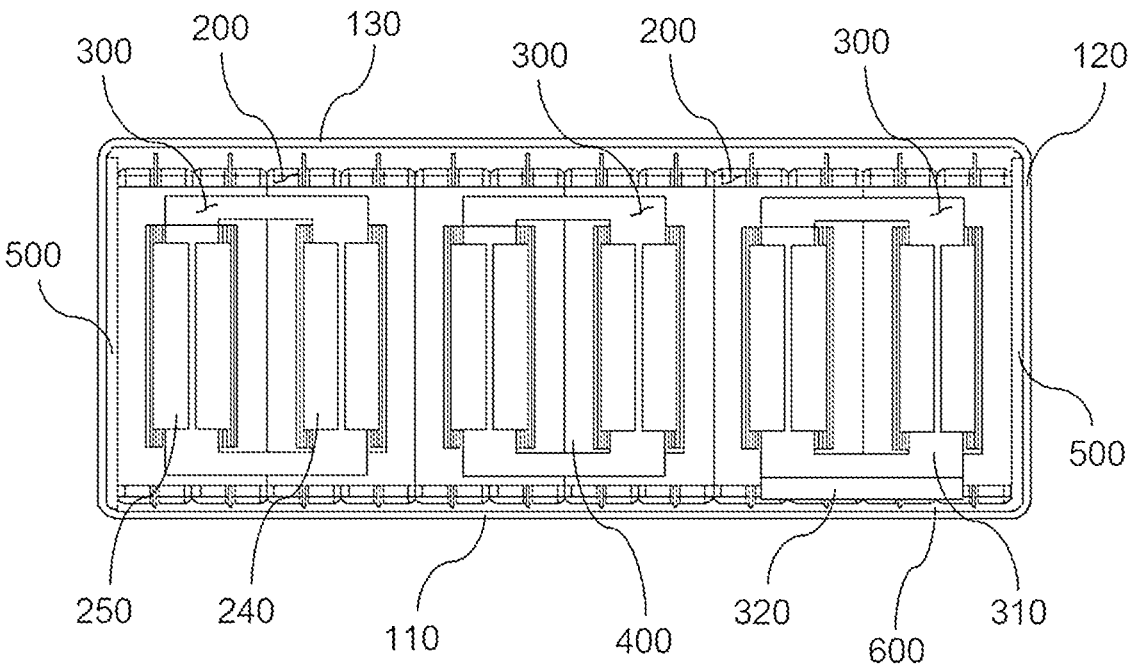
FIG. 3 is a front view of the battery module shown in FIG. 2.
Figure 4:
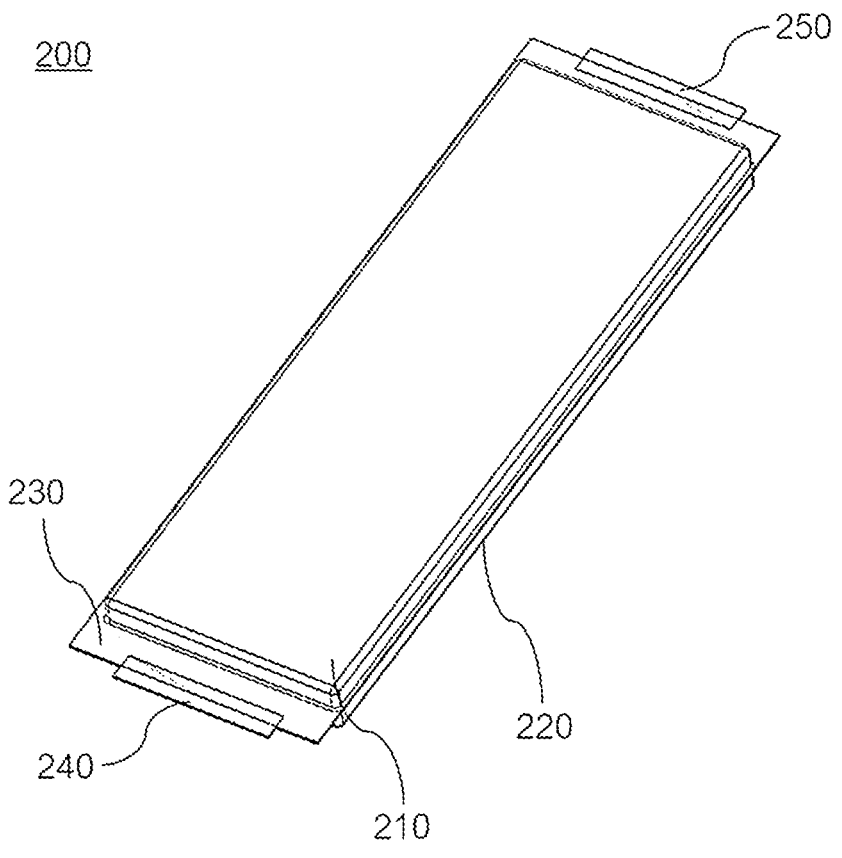
FIG. 4 is a perspective view of a battery cell that is mounted in the battery module according to the preferred embodiment of the present invention.

FIG. 2 is a perspective view of a battery module according to a preferred embodiment of the present invention, FIG. 3 is a front view of the battery module shown in FIG. 2, and FIG. 4 is a perspective view of a battery cell that is mounted in the battery module according to the preferred embodiment of the present invention.

Figure 5:
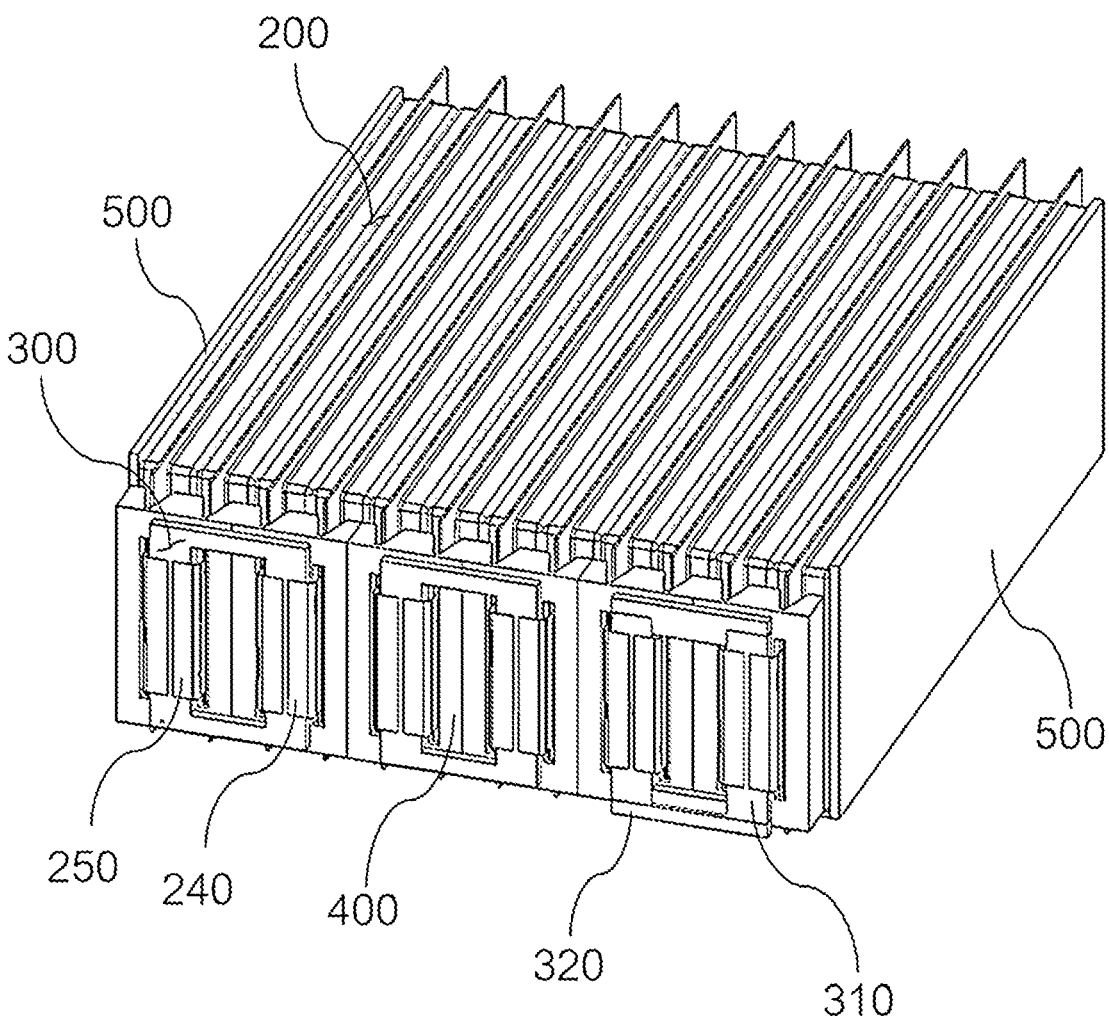
FIG. 5 is a perspective view of the battery module according to the preferred embodiment of the present invention in the state in which a module case is removed therefrom.
Figure 6:
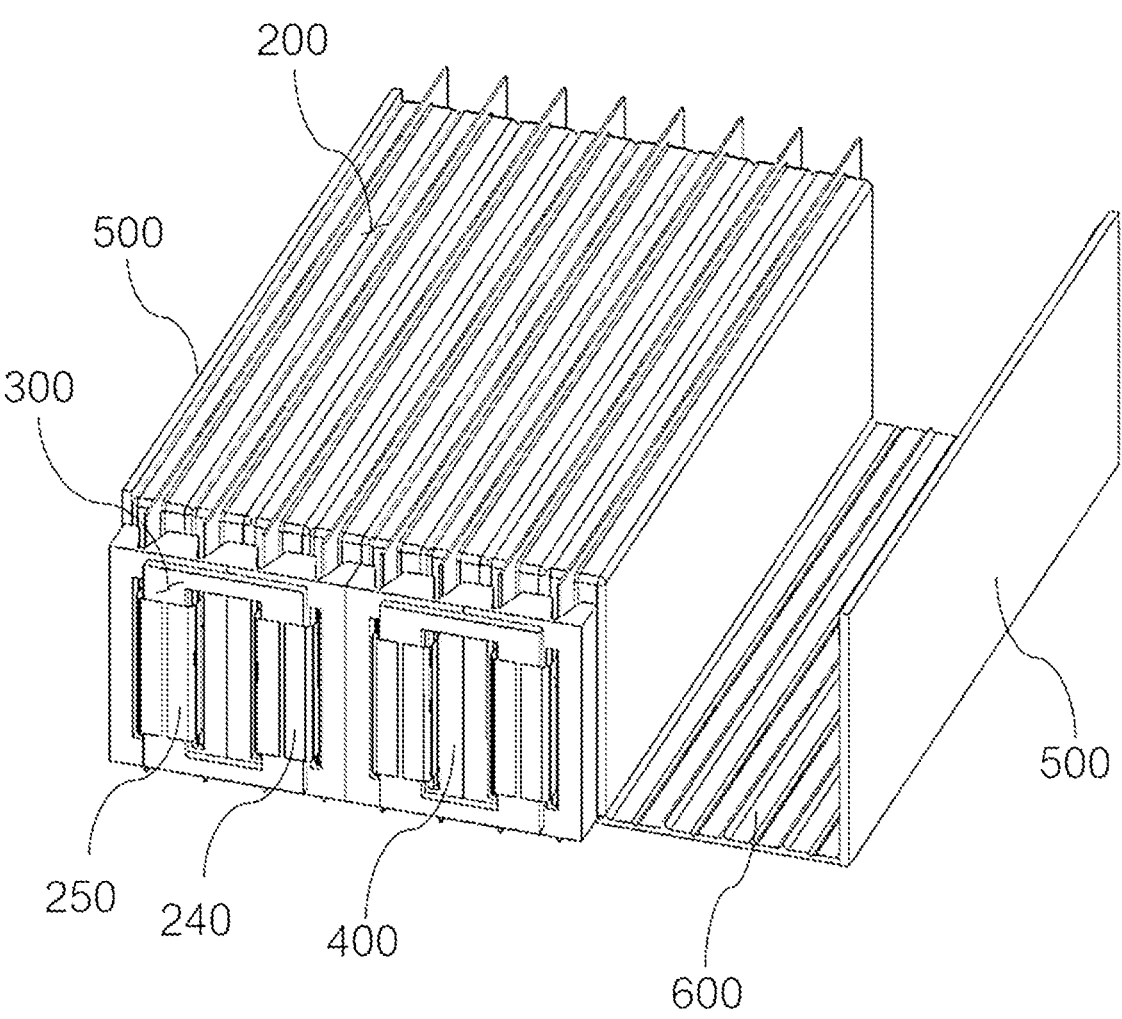
FIG. 6 is a perspective view of the battery module shown in FIG. 5 in the state in which some of battery cells, busbar frames, and busbars are separated therefrom.

In addition, FIG. 5 is a perspective view of the battery module according to the preferred embodiment of the present invention in the state in which a module case is removed therefrom, and FIG. 6 is a perspective view of the battery module shown in FIG. 5 in the state in which some of battery cells, busbar frames, and busbars are separated therefrom.

Referring to FIGS. 2 to 6, the battery module according to the present invention includes a module case 100, a plurality of battery cells 200, a plurality of busbars 300, a busbar frame 400, a shock absorption pad 500, and a heat dissipation pad 600.

The module case 100, which protects the battery cells 200, the busbars 300, the busbar frame 400, the shock absorption pad 500, and the heat dissipation pad 600 from external shock while receiving the same, may have an approximately hexahedral shape.

Specifically, the module case may include a bottom plate 110 and a top plate 130 configured to support and protect lower parts and upper parts of the battery cells 200, respectively, and a pair of side plates 120 configured to support side surfaces of the battery cells.

The bottom plate 110, the pair of side plates 120, and the top plate 130 may be integrally manufactured, or may be individually manufactured and connected to each other using known means, such as bolts. Although a front plate and a rear plate are not shown in the drawings, the front plate and the rear plate may be further provided as needed.

The battery cells (200) received in the module case 100, more specifically pouch-shaped battery cells, are erected upright and stacked side by side.

As an example, as shown in FIG. 4, a battery cell 200 includes an upper cell case 210, a lower cell case 220, an electrode assembly (not shown) received in the upper and lower cell cases, a sealed portion 230 provided at edges of the upper and lower cell cases, a pair of electrode tabs (not shown), a pair of electrode leads constituted by a positive electrode lead 240 and a negative electrode lead 250 each having one side electrically connected to a corresponding one of the electrode tabs and the other side protruding outwards from the cell cases, and an insulative film (not shown).

Specifically, each of the upper cell case 210 and the lower cell case 220 is provided with a pocket-shaped space portion configured to receive the electrode assembly.

The cell cases form a space portion capable of receiving the electrode assembly using a laminate sheet including an outer coating layer, a metal layer, and an inner coating layer.

The inner coating layer is disposed in direct contact with the electrode assembly, and therefore the inner coating layer must exhibit high insulation properties and high resistance to an electrolytic solution. In addition, the inner coating layer must exhibit high sealability in order to hermetically seal the cell case from the outside, i.e., a thermally-bonded sealed portion between inner layers must exhibit excellent thermal bonding strength.

The inner coating layer may be made of a material selected from among a polyolefin-based resin, such as polypropylene, polyethylene, polyethylene acrylate, or polybutylene, a polyurethane resin, and a polyimide resin, which exhibit excellent chemical resistance and high sealability. However, the present invention is not limited thereto, and polypropylene, which exhibits excellent mechanical-physical properties, such as tensile strength, rigidity, surface hardness, and impact resistance, and excellent chemical resistance, is the most preferably used.

The metal layer, which is disposed so as to abut the inner coating layer, corresponds to a barrier layer configured to prevent moisture or various kinds of gas from permeating into the battery from outside. An aluminum thin film, which is lightweight and easily shapeable, may be used as a preferred material for the metal layer.

The outer coating layer is provided on the other surface of the metal layer. The outer coating layer may be made of a heat resistant polymer that exhibits excellent tensile strength, resistance to moisture permeation, and resistance to air transmission such that the outer coating layer exhibits high heat resistance and chemical resistance while protecting the electrode assembly. As an example, the outer coating layer may be made of nylon or polyethylene terephthalate. However, the present invention is not limited thereto.

Meanwhile, the electrode assembly received in the upper cell case 210 and the lower cell case 220 may be classified as a stacked type electrode assembly, configured to have a structure in which a plurality of electrodes is stacked, a jelly-roll type electrode assembly, configured to have a structure in which a positive electrode and a negative electrode are wound in the state in which a separator is interposed therebetween, a laminated and stacked electrode assembly, configured to have a structure in which a plurality of unit cells is stacked, or a stacked and folded type electrode assembly, configured to have a structure in which a separator sheet is wound in the state in which unit cells are disposed on the separator sheet.

A unit cell is manufactured in order to constitute the laminated and stacked electrode assembly and the stacked and folded type electrode assembly. The unit cell may be a mono-cell, configured to have a structure in which a separator is interposed between a positive electrode and a negative electrode, or a bi-cell, configured to have a structure in which a positive electrode, a negative electrode, and a positive electrode or a negative electrode, a positive electrode, and a negative electrode are stacked in the state in which a separator is interposed between the positive electrode and the negative electrode.

The electrode assembly according to the present invention may be configured to have a structure in which a negative electrode, a separator, a positive electrode, a separator, and a negative electrode are stacked, and the number of positive electrodes and negative electrodes constituting the electrode assembly may be freely set. In addition, a laminated and stacked electrode assembly, configured to have a structure in which a plurality of unit cells is laminated, may be used. The structure of the electrode assembly may be applied to all electrode assembles described in this specification.

The positive electrode and the negative electrode of the electrode assembly are provided with a positive electrode tab and a negative electrode tab, respectively. The pair of tabs is disposed so as to protrude a predetermined length outwards from the cell case in a state of being connected respectively to a positive electrode lead 240 and a negative electrode lead 250 by spot welding.

The insulative film is located at an upper surface and a lower surface of each of the pair of electrode leads, more specifically the sealed portion 230, at which the upper cell case 210 and the lower cell case 220 are thermally fused.

Consequently, the flow of electricity generated from the electrode assembly to the cell case through the electrode leads is prevented, and sealing between the electrode leads and the cell cases is maintained. Here, the insulative film is preferably made of a non-conductive material that hardly transmits electricity. In general, an insulative tape that has a relatively small thickness while being easily attached to each of the electrode leads is widely used; however, the present invention is not limited thereto.

Although a bidirectional battery cell configured such that a positive electrode lead 240 and a negative electrode lead 250 are located so as to face each other is shown in the figure, a unidirectional battery cell configured such that a pair of electrode leads is disposed so as to face in the same direction may be used.

Next, the busbar will be described. The busbar 300 is configured to connect the plurality of battery cells 200 received in the module case 100 to each other in series or in parallel.

That is, the busbar 300 is a conductor having low impedance and high current capacity. The plurality of busbars 300 is disposed side by side in a direction in which the plurality of battery cells 200 is stacked so as to connect the battery cells 200 to each other in series or in parallel.

The busbar 300 according to the present invention is illustrated as being configured in a plate-shaped structure having a uniform thickness; however, the present invention is not limited thereto, and the busbar may be modified so as to have various structures in which electrical connection is possible.

Meanwhile, in the battery module according to the present invention, three busbars 300 are disposed at the front of the battery module to electrically connect the battery cells 200 to each other, and one of the busbars 300 is longer than the other busbars.

Specifically, referring to FIGS. 2, 3, and 5, the busbar 300 located at the right side, among the three busbars disposed side by side in a lateral direction of the module case 100, includes a busbar body 310 and an extension portion 320, wherein the extension portion 320 is located so as to protrude a predetermined length from a lower end of the busbar body 310 toward the bottom plate 110 of the module case 100. On the other hand, no extension portion is provided at each of the other two busbars 300.

During use of the battery module, thermal-fusion sealed portions may be separated from each other due to repeated charging and discharging, i.e., a thermally fused portion may be deteriorated due to repetition of swelling pressure due to gas generated by an irreversible reaction or the environment in which high current is used, such as quick charging, whereby the electrolytic solution may leak.

Of course, the electrolytic solution may leak due to various causes, such as tear of the case caused by external impact or chemical corrosion.

The electrolytic solution gathers on the bottom of the module case. In general, the size of the busbars mounted to the battery module or the distance of the busbars from the bottom of the module case are uniform. As a result, the plurality of busbars simultaneously contacts the electrolytic solution, whereby short circuit outside the cell occurs.

When the extension portion is formed at any one of the busbars and is disposed so as to face the bottom of the module case, as in the present invention, however, the one of the busbars may sense an increase in level of the leaked electrolytic solution in advance, whereby it is possible to detect and prevent short circuit outside the cell in advance, and therefore it is possible to inhibit occurrence of abrupt fire outbreak. The busbar having the extension portion is connected to and monitored by a Battery Management System (BMS). The BMS monitors and controls the states of the battery cells, such as voltage, current, insulation resistance and temperature. In a module case made of metal, contact of the extension portion with leaked electrolyte solution causes a change in the states monitored by the BMS. The changes in any state detected by the BMS are indicative of the leaked electrolyte solution. For example, the leaked electrolyte solution can be verified through insulation diagnosis performed by any known method. When the insulation resistance decreases below a predetermined value, the BMS controls the operation of the corresponding battery cell.

Here, the busbar body 310 and the extension portion 320 constituting the busbar 300 may be integrated; however, it is more preferable for the busbar body and the extension portion to be separated from each other such that the distance from the bottom surface of the case is easily adjusted. In this case, the busbar body 310 and the extension portion 320 may be made of the same material, and the busbar body 310 and the extension portion 320 may be connected to each other using a known fixing means, such as welding, a bolt, or a thermally conductive adhesive.

In the above, a description was given based on the front of the battery module. However, the same number of busbars may be located at the rear of the battery module, and any one of the busbars may extend a predetermined length toward the bottom surface of the case.

The busbar frame 400 is fixed to the module case 100 in a state of supporting the busbar 300. Specifically, the leads of the battery cells 200 are bent after extending through slits of the busbar 300, and are then fixed to the busbar 300 through a known fixing means, such as laser welding or resistance welding. In order to stably support the battery cells 200 and the busbar 300, the busbar frame 400 is located between the battery cells 200 and the busbar 300.

Although three busbar frames 400 are shown as being mounted in the drawings, this is merely one illustration, and one busbar frame or four or more busbar frames may be provided.

Next, the shock absorption pad will be described. The shock absorption pad 500 is interposed between an inner surface of the side plate 120 of the module case 100 and the battery cell 200. The shock absorption pad 500 is configured to press the battery cell 200 when the battery cell swells.

The shock absorption pad 500 is made of elastomer or foam, such as polyurethane foam; however, the present invention is not limited thereto.

Meanwhile, the heat dissipation pad 600 may be further provided between an upper surface of the bottom plate 110 of the module case 100 and the battery cell 200.

It is preferable for the heat dissipation pad 600, which discharges heat generated in the battery cell 200 to the outside and fixes the battery cells 200, to be made of a thermal interface material (TIM).

Next, a method of manufacturing a battery module according to an embodiment of the present invention will be described.

The method of manufacturing the battery module according to the present invention includes a step of preparing a module case 100, a plurality of battery cells 200, and a busbar 300 and a step of receiving the plurality of battery cells 200 in the module case 100 and electrically connecting the battery cells 200 to each other through the busbar 300.

Here, it is preferable for at least one busbar 300, among a plurality of busbars 300, to have an extension portion 320 protruding from a lower end of a busbar body 310 by a predetermined length toward a bottom plate 110 of the module case 100.

The battery module described above may constitute a battery pack, and may be applied to various devices.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and technical idea of the present invention, and it will be obvious that such changes and modifications fall within the scope of the appended claims.

DESCRIPTION OF REFERENCE NUMERALS

100: Module case
110: Bottom plate
120: Side plate
130: Top plate
200: Battery cell
210: Upper cell case
220: Lower cell case
230: Sealed portion
240: Positive electrode lead
250: Negative electrode lead
300: Busbar
310: Busbar body
320: Extension portion
400: Busbar frame
500: Shock absorption pad
600: Heat dissipation pad
The invention claimed is:
1. A battery module comprising:
a module case comprising a bottom plate, a side plate, and a top plate;
a plurality of battery cells received in the module case; and
a plurality of busbars configured to connect the plurality of battery cells to each other in series or in parallel,
wherein at least one of the plurality of busbars includes an extension portion protruding from a lower end of a busbar body by a predetermined length toward the bottom plate of the module case, a bottom edge of each extension portion being closer to the bottom plate than a bottom edge of the busbars of the plurality of busbars that are not the at least one of the plurality of busbars including the extension portion.

2. The battery module according to claim 1, wherein the bottom edge of each extension portion is spaced apart from an upper surface of the bottom plate of the module case by a predetermined distance.

3. The battery module according to claim 2, wherein the busbar body and each extension portion are integrally formed.

4. The battery module according to claim 2, wherein the busbar body and each extension portion are separated from each other and are electrically connected to each other by a connection member.

5. The battery module according to claim 4, wherein the connection member is welding or a thermally conductive adhesive.

6. The battery module according to claim 1, further comprising a shock absorption pad provided between an inner surface of the side plate of the module case and the plurality of battery cells.

7. The battery module according to claim 1, further comprising a heat dissipation pad provided between an upper surface of the bottom plate of the module case and the plurality of battery cells.

8. The battery module according to claim 1, further comprising a busbar frame interposed between the plurality of battery cells and the plurality of busbars.

9. The battery module according to claim 1, wherein each of the plurality of battery cells is a pouch-shaped battery cell.

10. A battery pack comprising the battery module according to claim 1.

11. A method of manufacturing the battery module according to claim 1, the method comprising:
   receiving the plurality of battery cells in the module case and electrically connecting the battery cells to each other through the busbar,
   wherein the at least one of a plurality of busbars is provided with the extension portion protruding from the lower end of the busbar body by the predetermined length toward the bottom plate of the module case.

* * * * *